United States Patent [19]

Schulze

[11] 3,715,365
[45] Feb. 6, 1973

[54] IMIDAZOLE SYNTHESIS
[75] Inventor: Heinz Schulze, Austin, Tex.
[73] Assignee: Jefferson Chemical Company, Inc., Houston, Tex.
[22] Filed: Feb. 8, 1971
[21] Appl. No.: 113,684

[52] U.S. Cl. ................................................260/309
[51] Int. Cl. ..............................................C07d 49/36
[58] Field of Search.....................................260/309

[56] References Cited

UNITED STATES PATENTS 2,801,243   7/1957   Hanslick et al. .......................260/309
2,905,692   9/1959   Paleveda et al. ......................260/309
3,580,925   5/1971   Manos..................................260/309

FOREIGN PATENTS OR APPLICATIONS 731,663   4/1966   Canada ................................260/309

OTHER PUBLICATIONS

Davidson et al., J. Org. Chem. Vol. 2, Pages 319–327 (1938).
Kortum et al., Pure and Applied Chemistry, Vol. 1, Pages 366, 375, 378, 391, 453–454, 466 & 516, (1961).

Primary Examiner—Natalie Trousof
Attorney—John R. Kirk, Jr., H. G. Jackson and Terrence Dean Dreyer

[57] ABSTRACT

An improved process for preparing imidazoles by contacting glyoxal or methyl substituted derivatives thereof, formaldehyde, and an ammonium salt of an acid having an ionization constant greater than $1 \times 10^{-3}$.

6 Claims, No Drawings

IMIDAZOLE SYNTHESIS

This invention relates to a process for improving the yield of imidazoles prepared from glyoxal, or methyl substituted derivatives thereof, and formaldehyde. In particular, this invention relates to a more efficient method for producing imidazoles wherein ammonium salts of strong acids are employed in the above-stated process.

Imidazole has been classically prepared from glyoxal and ammonia with or without added formaldehyde. The low yields thus obtained were described in early work by Ruggli and Henzi, in Helv. Chim. Acta 12, 362 (1929).

In Chemistry of Carbon Compounds, Volume IV A, E. M. Rodd, Editor, Elsevier, N. Y. p. 292 (1957), imidazole is stated to be best prepared by decarboxylation from 4:5-dicarboxylic acid or from glycine ethyl ester hydrochloride via 4-carbethoxy-2-mercaptoiminazole.

Additional methods advanced for preparing imidazoles include using glyoxal sulfate and formaldehyde in alkaline ammoniacal solution (Ruggli and Henzi, supra) and ammoniacal solutions of tartaric acid dinitrate and hexamethylene tetramine (Organic Synthesis, Collective Volume 3, Revised Ed., J. Wiley & Sons, Inc., N.Y.). Further, a vapor phase catalytic process employing dehydrogenation catalysts for forming imidazoles is disclosed in U. S. Pat. Nos. 3,255,200 and 3,037,028. As is evident, many methods have been advanced for preparing imidazoles. None, however, consist of an easily performed process which dually provides excellent yields, as does the instant invention.

A novel process for improving the yields of imidazoles has now been discovered wherein glyoxal, or methyl substituted derivatives thereof, formaldehyde, and ammonium salts of strong acids, i.e., acids having an ionization constant greater than $1 \times 10^{-3}$, are contacted at a pH of 7 or less to form the subject material.

It was very startling to discover that significantly higher yields of imidazole could be obtained using the classical synthesis process if ammonium salts of strong acids were employed therein. Therefore, in accordance with my discovery, glyoxal or pyruvaldehyde are contacted with formaldehyde and an ammonium salt of a strong acid having an ionization constant, i.e. ($K_1$) greater than $1 \times 10^{-3}$ at a temperature within the range of about 20° to 100°C., preferably about 70° to 95°C., for a time in the range of about 0.5 to 24 hours and at a pH equal or less than 7, to produce respectively imidazole and 4-methylimidazole. Longer time can of course be employed. The contacting can be conducted in any conventional reaction vessel that permits intimate contacting of the stated reactants such as a flask equipped with a reflux condenser. An aqueous reaction medium is provided and maintained essentially in the liquid phase.

The particular form of aldehyde employed is not critical, such that paraformaldehyde, or the like, can be substituted for or dually employed with the formaldehyde. Mixtures of the foregoing aldehydes can of course also be employed if desired.

Ammonium salts employed in the method of this invention are salts of strong acids having an ionization constant greater than $1 \times 10^{-3}$. Exemplary acids include sulfuric acid, oxalic acid, sulfonic acids such as p-toluene sulfonic acid, hydrochloric acid, phosphoric acid, and the like. The ammonium salts of sulfuric and oxalic acids are the preferred salts employed according to my invention.

The theoretical optimum molar ratio of the glyoxal compound to formaldehyde to ammonium salt component is 1:1:2. Wide latitudes in these ratios are of course employable, as will be evident to those skilled in the art. Economical factors favor operating reasonably close to the theoretical optimum ratios. Excesses of ammonium salts over and above those required for theoretical optimum ratios are, however, preferable. Correspondingly, about equivalent amounts of glyoxal and formaldehyde are employed with up to about 100% mol excess of ammonium salt.

The reaction medium of my process will during the course of the reaction become progressively more acid. It is, therefore, within the scope of my invention to substitute from about 0 to 50 wt. % of the ammonium salt with ammonia. This can be accomplished during the reaction without unduly increasing the pH or affecting the desired production of imidazole.

The imidazoles of this invention are useful as curing agents for epoxy resins and polyurethane foams or in the preparation of biocidal products. The subject product can be recovered from the reaction mixture by conventional methods. Exemplary recovery techniques are reported in the accompanying examples.

Illustrative of my ability to prepare imidazoles at high yields according to my invention, the following examples are presented. These examples are illustrative of the foregoing discussion and description and are not to be interpreted as limitation on the scope thereof or on the materials herein employed. The following examples can of course be repeated by substituting the generically and specifically described reactants and conditions of this invention for those employed in the examples.

EXAMPLE I

Ammonium sulfate (139.0 grams, 1.05 mols), 37 percent formaldehyde (163.0 grams, 2.0 mols) and 40 percent glyoxal (290.0 grams, 2.0 mols) were heated at 90°C. Ammonia (2.0 mols, conc. aqueous) was added dropwise over 75 minutes. When the ammonia was first added the pH of the solution was 4.7. The admixture was heated at 85° to 90°C. for another 75 minutes. The pH of the final admixture was 4.4.

After cooling, calcium hydroxide (91.5 grams, 1.23 mols) and water (200 milliliters) were added and the admixture heated at reflux while the ammonia was driven off. At 80° to 90°C. soluble calcium salts were precipitated with carbon dioxide. The precipitate was filtered and washed several times with methanol. The filtrate was distilled at an oil bath temperature of 140° to 160°C. At 4.0 millimeters to 0.2 millimeter pressure the imidazole fraction was taken off. The yield was 101 grams, containing 88 percent imidazole by gas liquid chromatographic analysis which corresponds to an imidazole yield of 66 percent based on the glyoxal charge.

EXAMPLE II

Ammonium sulfate (266 grams, 2.01 mols), water (200 milliliters), 37 percent formaldehyde (163 grams, 2.0 mols) and 40 percent glyoxal (290 grams, 2.0 mols) were heated 80 minutes at 85° to 95°C. The imidazole fraction (98 grams) was recovered as in Example I. Assay was 95.6 percent imidazole by GLC corresponding to 69 percent yield of imidazole based on the glyoxal charge.

EXAMPLE III

Ammonium oxalate monohydrate (284.4 grams, 2.0 mols), oxalic acid dihydrate (12.6 grams, 0.1 mol), 36 percent formaldehyde (167 grams, 2.0 mols) and 40 percent glyoxal (290 grams, 2.0 mols) were stirred 20 hours at 50° to 55°C. Methanol (200 milliliters) was added and the crystal slurry cooled, filtered, washed with methanol and dried. The yield of crude imidazole acid oxalate was 254 grams (m.p. 211° to 214°C. with decomp.).

The crude acid oxalate (79.0 grams, 0.5 mol) was suspended in isopropanol (200 milliliters). Ammonia (140 milliliters, conc. aqueous) was added with cooling and the mixture stirred overnight. Ammonium oxalate (73 grams) was recovered by filtration and can, if desired, be recycled for further use in imidazole formation. The filtrate was distilled as in the preceding example. Imidazole fraction was 27 grams (m.p. 83° to 87°C.).

EXAMPLE IV

Within 1¼ hour concentrated aqueous ammonia (126 grams, 2.0 mols) was added at 85° to 90°C. to a stirred mixture of ammonium sulfate (139 grams, 1.05 mols), 37 percent formaldehyde (163 grams, 2.0 mols) and 40 percent pyruvaldehyde (360 grams, 2.0 mols). Heating at 90°C. was continued for 90 minutes.

Calcium hydroxide (119 grams, 1.6 mols) and water (200 milliliters) were added and the reaction mixture heated one hour at the reflux temperature. Excess calcium hydroxide was neutralized at 90°C. with carbon dioxide. The precipitate was filtered and washed with boiling water. The filtrate was heated in the presence of Super-Cel filter acid (20 grams), filtered and stripped in an aspirator vacuum. (Maximum temperature of heating bath was 120°C.)

The imidazole fraction was taken off at 132° to 170°C. The distillate was 125 grams (27.8% N, 9.6 meq. base/gram, 77.2 area per cent, 4-methylimidazole by GLC) corresponding to 59 percent yield based on the pyruvic aldehyde charge.

As will be evident to those skilled in the art various modifications of this invention can be made or followed in light of the discussion and disclosure herein set forth without departing from the spirit or the scope thereof.

I claim:

1. A process for preparing an imidazole comprising reacting glyoxal or pyruvaldehyde with formaldehyde, wherein said reacting is conducted in an aqueous medium at a pH equal or less than 7 in the presence of an ammonium salt of an acid having an ionization constant greater than $1 \times 10^{-3}$ and wherein said acid is selected from sulfuric acid, oxalic acid, p-toluene sulfonic acid, hydrochloric acid, or phosphoric acid.

2. The process according to claim 1 wherein said reacting is conducted at a temperature within the range of about 20°C. to about 100°C. for a time in the range of about 0.5 to 24 hours.

3. The process according to claim 2 wherein said temperature is within the range of about 70°C. to about 95°C. and wherein said acid is selected from oxalic acid or sulfuric acid.

4. The process according to claim 2 wherein said reacting is conducted at a temperature in the range of about 70°C. to about 95°C., wherein pyruvaldehyde is employed, and wherein said acid is oxalic or sulfuric acid.

5. The process according to claim 2 wherein said reacting is conducted at a temperature in the range of about 70°C. to about 90°C., wherein glyoxal is employed, and wherein said acid is oxalic or sulfuric acid.

6. The process according to claim 2 wherein said ammonium salt is ammonium oxalate and wherein ammonium oxalate is recovered subsequent to said contacting and reemployed for preparing imidazoles according to the process of claim 3.

* * * * *